United States Patent [19]

Iwata et al.

[11] Patent Number: 4,724,111
[45] Date of Patent: Feb. 9, 1988

[54] METHOD FOR MOLDING CORRUGATED PIPE SLEEVE

[75] Inventors: Masanori Iwata; Yoshiaki Tatsumi, both of Osaka, Japan

[73] Assignee: Takiron Co., Ltd., Osaka, Japan

[21] Appl. No.: 941,487

[22] Filed: Dec. 15, 1986

[51] Int. Cl.⁴ .................. B28B 1/48; B29C 45/14
[52] U.S. Cl. .................. 264/155; 264/266; 264/274; 264/279; 264/328.1
[58] Field of Search ........ 264/266, 274, 279, 154–155; 138/121

[56] References Cited

U.S. PATENT DOCUMENTS

| | | | |
|---|---|---|---|
| 2,604,661 | 7/1952 | Karns | 264/275 |
| 2,986,411 | 5/1961 | Anderson | 264/274 |
| 3,291,881 | 12/1966 | Michael | 264/266 |
| 3,395,591 | 8/1968 | Shaeffer | 264/274 |
| 3,435,107 | 3/1969 | Conrad | 264/274 |
| 4,088,156 | 5/1978 | Kubo et al. | 264/274 |
| 4,134,431 | 1/1979 | Davidson et al. | 264/279 |
| 4,303,104 | 12/1981 | Hegler et al. | 138/121 |
| 4,534,923 | 8/1985 | Lupke | 138/121 |

*Primary Examiner*—Jan H. Silbaugh
*Assistant Examiner*—James Bartholomew
*Attorney, Agent, or Firm*—Sughrue, Mion, Zinn, Macpeak, and Seas

[57] ABSTRACT

A method of molding a sleeve on a corrugated pipe consisting of an inner wall and fusion-bond ridges. Two clamps can close to engage several of the ridges. One to three of the ridges project into a molding space between the clamps. A core is inserted into pipe and closes the molding space. Hot pressurized resin softens and collapses the projected ridges and fusion bonds the pipe to the sleeve portion of the molding space.

13 Claims, 8 Drawing Figures

METHOD FOR MOLDING CORRUGATED PIPE SLEEVE

BACKGROUND OF THE INVENTION

1. Field of the Invention

This invention relates to a method for molding a connecting plastic sleeve integral with one end of a plastic corrugated drainpipe for use in civil construction work or agriculture, e.g.

2. Background of the Invention

A plastic corrugated pipe 1 shown in FIG. 5 is increasingly used as a drainpipe in civil construction work or agriculture. The corrugated pipe 1 is of a double-wall structure and has an outer wall 11 formed of alternate annular ridges 111 and annular grooves 112. An inner wall 12 is fusion-bonded to the grooves 112. Such a corrugated pipe 1 is not only more pressure resistant but is also flexible while relatively light in weight and allows water to smoothly flow therethrough. Due to the above advantages, the corrugated pipe 1 is readily usable as a drainpipe. A variation in which a water passagehole is made in the portion where the inner wall 12 is fusionbonded to the groove 112 is particularly recommended as a drainpipe for underdrainage.

Two corrugated pipes are usually connected together using a tube joint. It may sometimes be required, however, to connect two pipes in such a manner as to insert one pipe into a sleeve, which is a receptacle integral with an end of the other pipe 1.

When the connecting sleeve is formed at one end of a conventional cylindrical plastic pipe, the sleeve end is heated to over the softening temperature and sectional dies for forming the sleeve are forced into that end to enlarge the diameter. However the above conventional method applied to the formation of a sleeve at the end of the corrugated pipe 1, as shown in FIG. 6 with sectional dies 2, presents the following problems. If the end of the corrugated pipe 1 is heated too fast, the air enclosed in between the ridge 111 of the outer wall 11 and the inner wall 12 will be rapidly expanded by heat and the pressure thus developed may damage the ridge 111 or inner wall 12. Moreover, if the end thereof is made too soft by excessive heating or if the sectional dies are expanded too strongly or too fast, the ridge 111 will be deformed or put out of shape. The thus degraded external appearance will reduce its commercial value by a large margin. Particularly, in the case of a corrugated pipe having water passageholes, the external appearance will be deteriorated further because the water passageholes are forced to enlarge and, when the pipe is buried under the ground, a great deal of earth and sand is allowed to penetrate into the pipe through the water passageholes and the pipe may become clogged with it. When use is made of the conventional method of expanding the diameter at the end of the corrugated pipe 1 to form a sleeve, the end thereof must be treated carefully, that is, it must be heated gently and expanded slowly by the sleeve forming segmental dies. In consequence, it takes at least more than five minutes to form a sleeve. Accordingly, extremely low forming efficiency and difficulties in setting forming conditions have reduced production efficiency.

The present inventors developed a method for molding a sleeve by injection molding as shown in FIG. 7 to solve the above problems and filed a patent application with the Japanese Patent Office (Japanese published Patent Application No. 175013/86. The above method comprises preheating and applying pressure to one end 1a of a corrugated pipe 1 to squash two ridges to form a circular pipe. The circularized pipe end of the corrugated pipe 1 is inserted into a mold 3 equipped with a cavity 31 for molding a sleeve. Molten resin 4a is injected from the resin injection hole 32 into the cavity 31 to mold a sleeve 4, as shown in FIG. 8, which is integral with the end 1a of the corrugated pipe 1. Since this method requires no process of expanding the diameter of the end of a corrugated pipe as in the case of the conventional one, it offers high forming efficiency and is fit for mass-production because a sleeve can be formed in less then one minute. Notwithstanding, there is still room for improvement from the following standpoints.

In the first place, the end 1a of the corrugated pipe 1 must be preheated with pressure or cut by a lathe to squash the ridges to form a circular pipe, which results in an increase in the number of production steps.

In the second place, the contact between the end 1a of the corrugated pipe 1 and the outer clamps 33 of the mold 3 is insufficient since the ridges at the end 1a thereof are squashed to form the circular pipe. Accordingly, the molten resin may leak out through the small gap between the end 1a of the corrugated pipe 1 and the outer clamps 33 during the injection of the molten resin. The molten resin thus leaked out forms a flash 41 at the root of the molded sleeve 4, as shown in FIG. 8, thus presenting an ugly appearance. Moreover, the wall thickness of the sleeve 4 is caused to slightly vary because the quantity of the resin being injected into the cavity 31 of the mold 3 for molding the sleeve is not precisely fixed.

Another improvement that should be made is that, since the ridges at the end 1a of the corrugated pipe 1 are squashed to form the circular pipe, the outer periphery thereof tends to be scarcely caught by the mold 3. Therefore, the end 1a of the corrugated pipe 1 may be forced back with the pressure applied during the injection of the molten resin. As a result, the sleeve may be molded unsatisfactorily.

Still another improvement that should be made is concerned with the concentration of heat deformation. When the sleeve 4 is injection-molded in such a manner as to envelop the end 1a of the corrugated pipe 1, heat deformation tends to be concentrated at the root of the sleeve 4. Consequently, if the end 1a of the corrugated pipe 1 is thin, the root of the sleeve 4 is readily broken out on receiving a shock.

SUMMARY OF THE INVENTION

It is therefore an object of the present invention to provide a method for molding a sleeve with high forming efficiency without the process of squashing the ridges at the end of a corrugated pipe beforehand.

It is another object of the present invention to provide a method for molding a sleeve offering a good exterior appearance without a flash in its root portion and having uniform wall thickness by preventing molten resin from leaking out through the gap between the outer clamp and the end of a corrugated pipe.

It is still another object of the present invention to provide a method for molding a sleeve free from defects resulting from the forced back end of a corrugated pipe during the injection of molten resin.

It is a further object of the present invention to provide a method for molding a sleeve wherein the concentration of heat deformation in its root portion can be relieved.

The above objects can be achieved by a method for molding a sleeve according to the present invention. The method comprises the steps of setting the end of a plastic corrugated pipe composed of an outer wall formed of alternate annular ridges and annular grooves and a cylindrical inner wall fusion-bonded to the grooves in such a state that the end thereof has been forced into a sleeve-molding space of an injection mold having the sleeve-molding space between its core and outer clamps. Molten resin is injected into the sleeve-molding space so as to fusion-soften the end of the corrugated pipe utilizing the resin heat. The ridges are squashed while discharging most of the air confined in between the ridges and the inner wall at the end thereof with the resin pressure out of the sleeve-molding space to fusion-bond the resin to the end thereof.

DETAILED DESCRIPTION OF THE PREFERRED EMBODIMENTS.

According to the present invention, the end of the corrugated pipe is set in such a manner that the end thereof has been forced into the sleeve-molding space without squashing the ridges at its end. The ridges are squashed by making use of the heat and pressure of the molten resin injected into the sleeve-molding space, whereby it becomes entirely unnecessary to preheat and apply pressure to the end of the corrugated pipe to squash the ridges prior to setting its end in the injection mold. The sleeve can thus be molded highly efficiently. Although the present inventors initially expected that such an attempt to mold a sleeve in the sleeve-molding space while squashing the ridges at the end of the corrugated pipe could be abortive because the air sealed up in between the ridges and the inner wall was unable to escape, they have discovered, however, that the ridges are squashed completely because the ridges and the inner wall can be actually torn off slightly to allow most of the air to flow into the sleeve-molding space, pass through the small gap between the inner wall and the core and then discharge out of the space. Based on this discovery, they completed the present invention.

Since the ridges at the end of the corrugated pipe are squashed in the sleeve-molding space, the ridges thus squashed work to block the gap through which the resin is caused to leak out, i.e., the gap between the outer forces and the outer wall of the corrugated pipe, consequently preventing the resin from leaking out of the sleeve-molding space. The sleeve molded according to method of the present invention looks better because no flash is produced in its root portion and, because the quantity of molten resin being injected into the sleeve-molding space becomes roughly constant. The wall thickness of the sleeve is also prevented from varying.

Since the end of the corrugated pipe is set in the state of being forced into the sleeve-molding space without squashing its ridges, the corrugated pipe will never be pushed back because the ridges are caught by the front of the sleeve-molding space even though there is applied force toward pushing their corrugated pipe back because of the resin injection pressure.

Since the molten resin is fusion-bonded to the end of the corrugated pipe to mold the sleeve while the ridges are being squashed according to the present invention, heat deformation is hardly concentrated in the root portion of the sleeve but extended to an edge of the ridge remaining as a wall, so that the impact properties of the root portion thereof may seldom be reduced.

Referring now to the accompanying drawings, a preferred embodiment of the present invention will be described.

Figure 1:
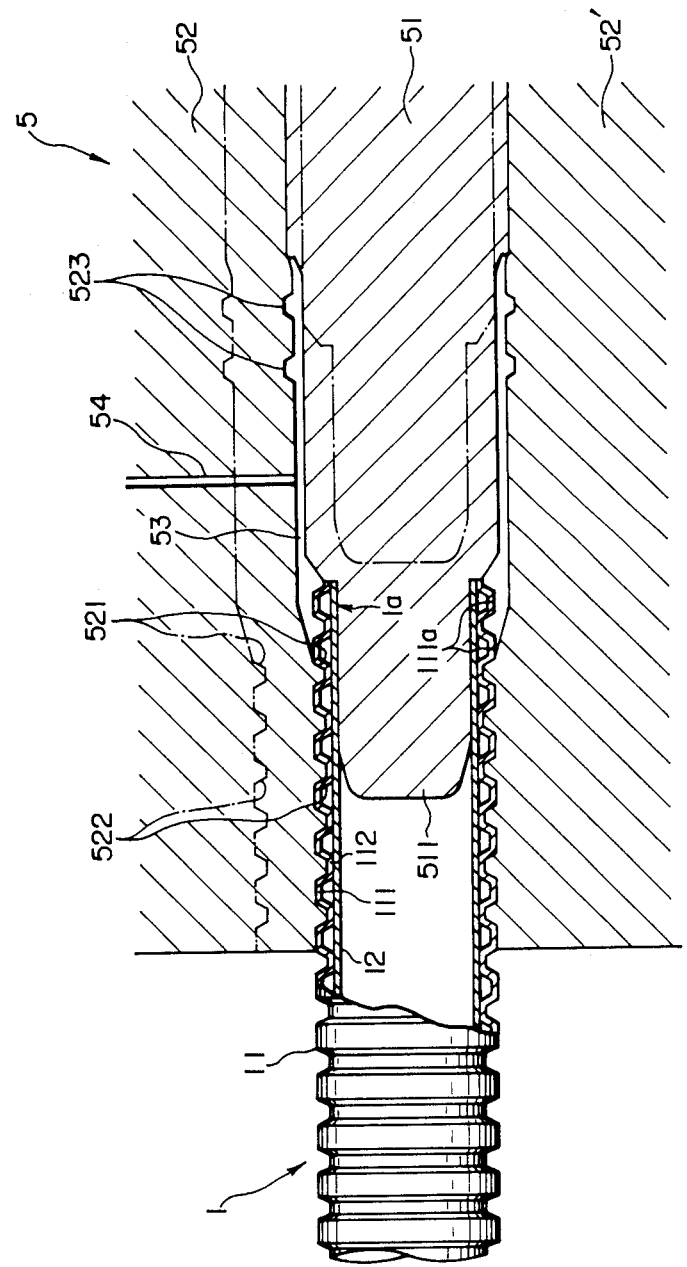
FIG. 1 is a sectional view of a corrugated pipe set in an injection mold.

In the method for molding a sleeve according to the present invention, as shown in FIG. 1, one end 1a of a corrugated pipe 1 is set in such a state that its end is forced into a sleeve-molding space 53 of an injection mold 5 without squashing ridges 111a at the end of the pipe 1. The plastic corrugated pipe 1 used in this embodiment is of double-wall structure and has an outer wall 11 formed of alternate annular ridges 111 and annular grooves 112 and a roughly cylindrical inner wall 12 fusion-bonded to the grooves 112. In this case, water passageholes may further be made in the portion where the inner wall 12 of the corrugated pipe is fusion-bonded to the groove 112.

On the other hand, the injection mold 5 is provided with the sleeve-molding space 53 formed between a core 51 and segmented upper and lower outer clamps 52, 52'. The lower outer clamp 52' is fixed, whereas the upper outer clamp 52 is movable vertically between the open position shown by a virtual line and the closed position shown by a continuous line. The core 51 is also movable longitudinally between the retreat position shown by a virtual line and the forward position shown by a continuous line. The core 51 is equipped with a head 511 to be fitted into the end 1a of the corrugated pipe 1. The upper and lower clamps 52, 52' are provided with corrugated inner surfaces 522 engaging with the front ridges 111 and grooves 112 on the outer wall 11 of the corrugated pipe.

The setting of the corrugated pipe in the injection mold 5 is conducted as follows. The core 51 and the upper outer clamp 52 are respectively moved to the back and open positions beforehand and the corrugated pipe 1 is mounted on the lower outer clamp 52' so that its two ridges 111a at the end 1a thereof are forced into the sleeve-molding space 5. Then, the ridges 111 and grooves 112 are made to engage with the corrugated inner surface 522. Subsequently, the core 51 is moved forward to fit its head 511 into the end 1a of the corrugated pipe 1. As the front of the head 511 is tapered, the head 511 can easily be fitted therein even if the position or direction of the corrugated pipe 1 is slightly shifted. The corrugated pipe 1 is fixed in position and direction when it is thus fitted until its root of the head 511 abuts against the end 1a of the pipe 1. The upper outer clamp 52 is lastly lowered and its corrugated inner surface 522 is made to engage with the ridges 111 and grooves 112 of the corrugated pipe 1 to envelope and fix the portion close to the end of the corrugated pipe 1. While the corrugated pipe 1 is thus set, the side of the second ridge 111a from the end 1a of the corrugated pipe 1 abuts against the front dividing face 521 of the sleeve-molding space of the outer clamps 52, 52'.

Since the corrugated inner surfaces 522 of the upper and lower outer clamps 52, 52' are engaged with the ridges 111 and grooves 112 to envelope and fix the portion close to the end of the corrugated pipe 1, the corrugated pipe 1 can be set firmly and steadily. Consequently, when the molten resin is injected into the sleeve-molding space 53 as described hereinafter, the corrugated pipe 1 is never pushed back by the pressure applied. To envelop and firmly fix the corrugated pipe 1, it is preferred to set the number of ridges 111 engaging with the rugged surfaces 522 of the outer clamps 52, 52' within the range of 2–10. Six ridges 111 are made to engage with the rugged surfaces 522 in this embodiment. If one ridge 111 is engaged therewith, the corrugated pipe 1 may be fixed unsatisfactorily, whereas the outer clamps 52, 52' will become unnecessarily large if more than 10 ridges are thus engaged. Either of the above cases is therefore not preferred.

Figure 2:
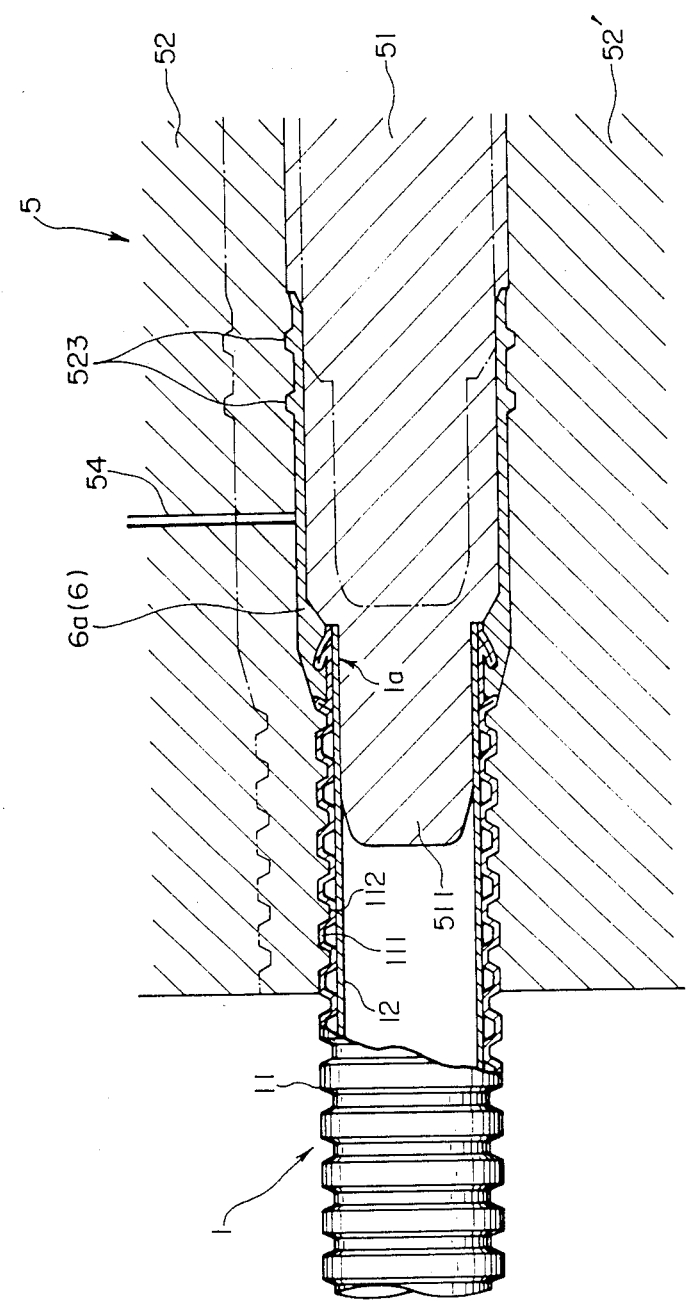
FIG. 2 is a sectional view of the sleeve-molding space of the injection mold into which molten resin has been injected.

When the corrugated pipe 1 is thus set, as shown in FIG. 2, the molten resin 6a is injected from the injection hole 54 into the sleeve-molding space 5. Since the molten resin 6a is thus injected, the end 1a of the corrugated pipe 1 is softened and fused by the heat of the resin 6a and the two ridges 111a at the end 1a of the corrugated pipe 1 are squashed by the pressure of the heated resin 6a so that the resin 6a is fusion-bonded to the end 1a of the corrugated pipe 1 to form the sleeve 6 integral with the pipe 1. Most of the air confined in between the ridges 111a and the inner wall 12 is caused to flow into the sleeve-molding space 53 through a crack produced in the ridge 111a and the inner wall 12. The air is further discharged out of the sleeve-molding space 53 through the small gap between the inner wall 12 and the core 51. Thereby the two front ridges 111a are almost completely squashed.

Figure 3:
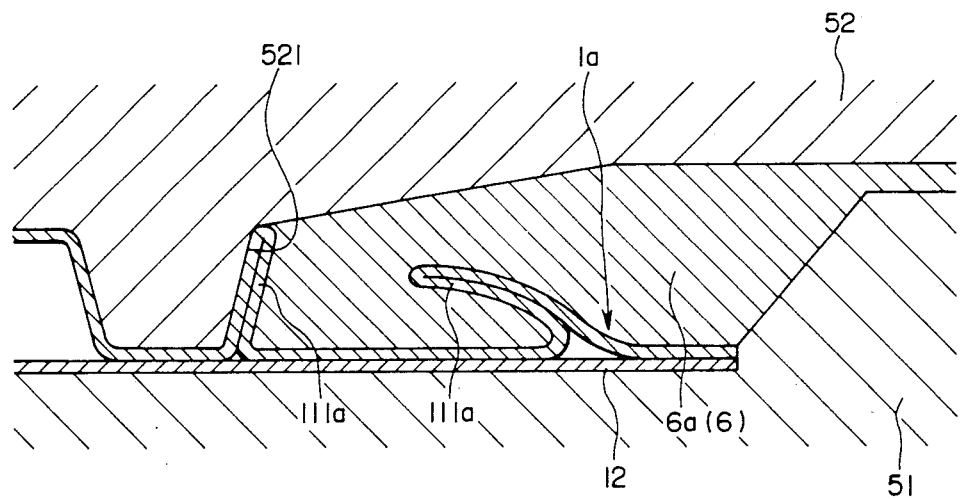
FIG. 3 is an enlarged version of FIG. 2.

FIG. 3 shows typical profiles of the squashed ridges 111a. More specifically, the endmost ridge 111a at the end 1a of the corrugated pipe 1 has been deformed in the direction of the injected molten resin 6a and bent on itself with a small space left between itself and the inner wall 12. On the contrary, the second ridge 111a from the end 1a of the corrugated pipe 1 has been pressed against the front dividing face 521 of the sleeve-molding space and bent on itself and, because it receives the pressure of the molten resin 6a directly, there is no space left between itself and the inner wall 12. Since the second ridge 111a from the end thereof is pressed against the front dividing face 521 and thus squashed, the second ridge 111a works to check the leakage of the molten resin 6a. In consequence, no flash is produced at the root of the sleeve 6, whereby the sleeve 6 having a good external appearance is formed. Moreover, the corrugated pipe 1 is never pushed back because of the pressure of the resin 6a since the second ridge 111a is caught by the front dividing face 521. Since the molten resin 6a is fusion-bonded to the end 1a of the corrugated pipe 1 to form the sleeve while the ridges 111a at the end 1a of the corrugated pipe 1 are squashed as shown in FIG. 3, heat deformation is decentralized over the squashed ridges 111a and not concentrated at the root of the sleeve 6. As a result, there is little fear for reduction in shock resistance at the root of the sleeve 6.

As the molten resin 6a, use can be made of what is compatible with the material resin of the corrugated pipe 1, e.g., polyethylene, high-density polyethylene, polyvinyl chloride, polypropylene and the like. Of the above materials, the high-density polyethylene is most suitable because it is less expensive but offers excellent formability and high strength. In addition, it is generally used as the material resin of the corrugated pipe 1. The temperature and pressure immediately before the injection of the molten resin 6a are dependent on the kind of resin and the size of the corrugated pipe 1 and may be determined according to the kind and the size thereof. When the sleeve 6 is molded using high-density polyethylene as the molten resin 6a at the end of a corrugated pipe of high-density polyethylene having a diameter of 100 mm and inner and outer wall thicknesses range from 0.4–1.5 mm, it is preferred to set the resin temperature to 180°–230° C., the injection pressure at a maximum of 120 kgf/cm$^2$ or lower. The adoption of these temperature and pressure conditions makes it possible to heat the end 1a of the corrugated pipe 1 at over 135° C. to sufficiently soften and fuse its end, almost completely squash the end ridges 111a and allow the molten resin 6a to be firmly fusion-bonded to its end.

Although two ridges 111a at the end 1a of the corrugated pipe 1 are to be squashed in this embodiment, at least one of the ridges 111a or three ridges at a maximum should be squashed. If more than three ridges are to be squashed, all the ridges 111a are not easily squashed and the quantity of molten resin to be injected increases, i.e., it is uneconomical.

Obviously according to the present invention, a sleeve can be formed efficiently at the end of not only a small corrugated pipe whose diameter is about 50 mm and inner and outer wall thicknesses range from 0.3 to 1.2 mm but also a large one whose diameter is about 400 mm and inner and outer wall thicknesses range from 1.0 to 4.0 mm. Particularly when a sleeve is formed at the end of a large corrugated pipe, it is preferred to smooth the air discharge at the time of injection molding by boring an air vent in the ridge to be squashed or inner wall at the end of the corrugated pipe to ensure that the ridge is readily squashed.

Figure 4:
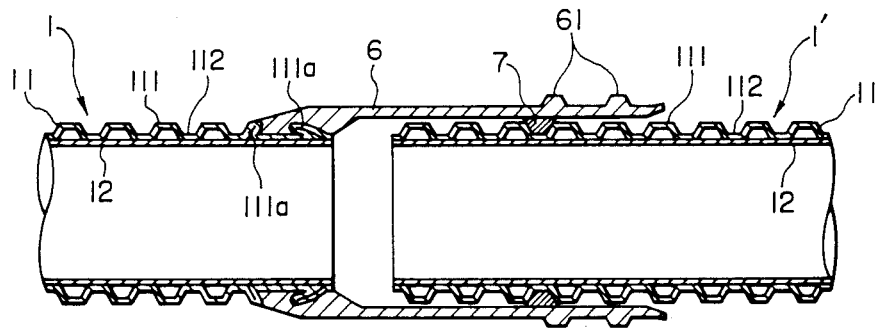
FIG. 4 is a sectional view of the corrugated pipe with a sleeve in receipt of another corrugated pipe.
Figure 5:
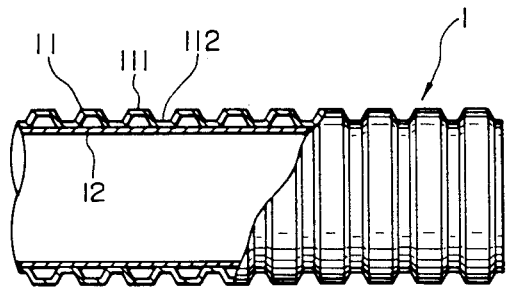
FIG. 5 is a partial sectional view showing the structure of the corrugated pipe.
Figure 6:
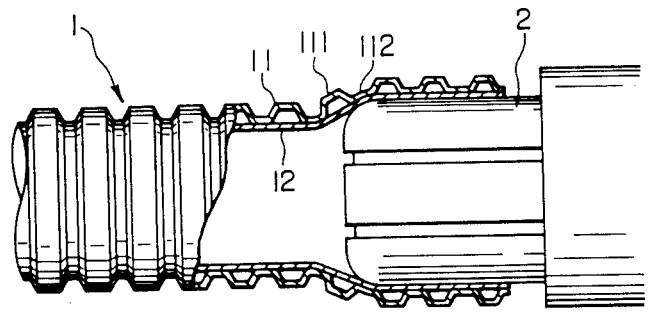
FIG. 6 is a sectional view showing a conventional method for forming a sleeve.
Figure 7:
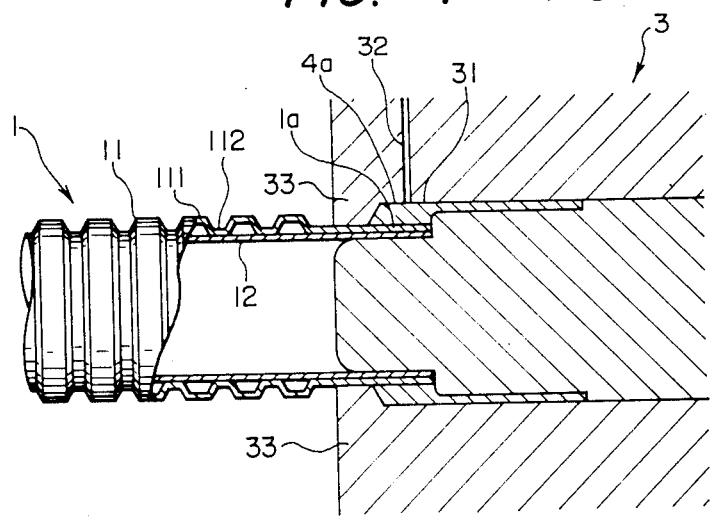
FIG. 7 is a sectional view showing a conventional method developed by the present inventors for molding a sleeve.
Figure 8:
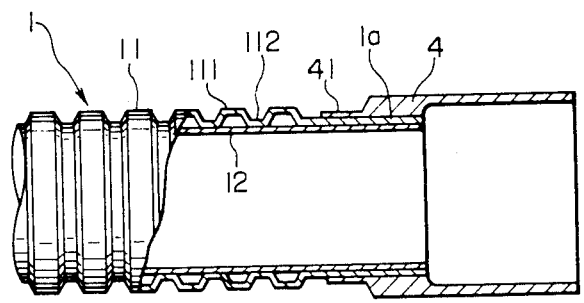
FIG. 8 is a partial sectional view of the corrugated pipe with the sleeve formed through the method of FIG. 7.

The corrugated pipe 1 equipped with a sleeve integral with one end thereof according to the present invention is extremely convenient in that, as shown in FIG. 4, another corrugated pipe 1' can readily be coupled thereto by inserting the end of the second pipe 1' into the sleeve 6. As set forth above, moreover, the exterior appearance of the sleeve 6, particularly the portion at its root is excellent and the shock resistance of the root portion is satisfactory, so that such a corrugated pipe is of high commercial value. When two corrugated pipes are coupled in the above state, the force applied in the direction in which the diameter of the sleeve 6 is expanded tends to gather and, if the diameter of the sleeve is expanded thereby, the corrugated pipe 1' may easily slip off the sleeve 6, thus causing water leakage. In order to prevent such leakage, it is preferred to provide, as shown in FIG. 1, a plurality of rib forming grooves 523 in the outer clamps 52, 52' to form a plurality of annular reinforcing ribs 61 (FIG. 4) on the sleeve 6. An O-ring 7 is fitted in the groove at the end of the corrugated pipe 1' to be plugged.

What is claimed is:

1. A method for molding a sleeve on a corrugated pipe comprising the steps of:
   setting an end of a plastic corrugated pipe into a cavity of an injection mold defined between a core and outer mold clamps and closing said injection mold to define a sleeve-molding space between the end of said corrugated pipe positioned on said core and said outer mold clamps, said pipe end comprising an outer wall formed of alternate annular ridges and annular grooves and a cylindrical inner wall fusion bonded to said grooves; and
   forming said sleeve by injecting molten resin into said sleeve-molding space so as to fusion-soften the end of said corrugated pipe utilizing a heat of said molten resin, to squash the ridges while discharging most of the air confined in between the ridges and the inner wall at the end thereof out of said sleeve-molding space with the resin pressure and to fusion-bond the resin forming said sleeve to said pipe end including said squashed ridges.

2. A method for molding a sleeve on a corrugated pipe as claimed in claim 1, wherein said outer mold clamps define front dividing faces of said sleeve-molding space and said corrugated pipe is set in such a state that the side of one ridge at the end of said pipe is abutting against said front dividing faces.

3. A method for molding a sleeve on a corrugated pipe as claimed in claim 2, wherein said outer mold clamps have inner corrugated surfaces in a direction of said front dividing faces away from said sleeve-molding space, said inner corrugated surfaces engaging with the ridges and grooves on the outer wall of said corrugated pipe and wherein said corrugated pipe is set in such a state that the portion close to the end of said corrugated pipe is enveloped and fixed by said inner corrugated surfaces.

4. A method for molding a sleeve on a corrugated pipe as claimed in claim 1, wherein the number of ridges at the end of said corrugated pipe set into said sleeve-molding space is 1–3.

5. A method for molding a sleeve on a corrugated pipe as claimed in claim 2, wherein the number of ridges at the end of said corrugated pipe set into said sleeve-molding space is 1–3.

6. A method for molding a sleeve on a corrugated pipe as claimed in claim 3, wherein the number of ridges at the end of said corrugated pipe set into said sleeve-molding space is 1–3.

7. A method for molding a sleeve on a corrugated pipe as claimed in claim 3, wherein the number of ridges on the outer wall of said corrugated pipe which engage with the corrugated surfaces of said outer mold clamps is 2–10.

8. A method for molding a sleeve on a corrugated pipe as claimed in claim 3, wherein said outer mold clamps are vertically divided segmental clamps and wherein said setting step comprises:
   mounting said corrugated pipe on a lower one of said clamps;
   engaging the ridges and grooves of said corrugated pipe with the inner surface of the lower clamp,
   moving and fitting the core in the end of said corrugated pipe;
   lowering an upper one of said clamps, thereby engaging the ridges and grooves of said corrugated pipe with the inner corrugated surface of the upper clamp.

9. A method for molding a sleeve on a corrugated pipe as claimed in claim 1, further comprising boring an air vent in a ridge or an inner wall at the end of said corrugated pipe set into said sleeve-molding space beforehand.

10. A method for molding a sleeve on a corrugated pipe as claimed in claim 1, wherein said molten resin is high-density polyethylene.

11. A method for molding a sleeve on a corrugated pipe as claimed in claim 10, wherein the temperature of the high-density polyethylene immediately before being injected is set at 180–230° C., whereas the injection pressure thereof is set at maximum of 120 kgf/cm$^2$.

12. A method for molding a sleeve on a corrugated pipe as claimed in claim 1, wherein said sleeve-molding space includes a sleeve portion extending away from the end of said corrugated pipe and having an inner diameter larger than an outer diameter of said inner wall of said corrugated pipe.

13. A method for molding a sleeve on a corrugated pipe as claimed in claim 12, wherein said sleeve-molding space further comprises at least one circumferential outwardly extending rib-forming groove.

* * * * *